United States Patent [19]
Lithander

[11] Patent Number: 5,549,759
[45] Date of Patent: Aug. 27, 1996

[54] METHOD AND APPARATUS FOR CLEANING CYLINDRICAL COMPONENTS WHICH ARE TRANSVERSELY ROTATED IN A DRUM DURING LIQUID TREATMENT

[75] Inventor: Erik J. Lithander, Gothenburg, Sweden

[73] Assignee: Niagara Tube Washing Systems AB, Kristinehamn, Sweden

[21] Appl. No.: 295,869

[22] PCT Filed: Mar. 9, 1993

[86] PCT No.: PCT/SE93/00213

§ 371 Date: Nov. 21, 1994

§ 102(e) Date: Nov. 21, 1994

[87] PCT Pub. No.: WO93/17804

PCT Pub. Date: Sep. 16, 1993

[30] Foreign Application Priority Data

Mar. 9, 1992 [SE] Sweden .................................. 9200708

[51] Int. Cl.⁶ ...................................................... B08B 9/02
[52] U.S. Cl. .................... 134/22.11; 134/22.12; 134/33; 134/153; 134/166 C; 134/169 C; 134/170

[58] Field of Search ..................... 134/152, 153, 134/53, 54, 170, 169 C, 166 C, 22.11, 22.12, 32, 33, 10

[56] References Cited

U.S. PATENT DOCUMENTS

| | | | |
|---|---|---|---|
| 3,103,939 | 9/1963 | Brockmann et al. | 134/134 |
| 3,106,731 | 10/1963 | Garriott | 134/153 |
| 3,490,468 | 4/1967 | Donato | 134/152 |
| 4,116,716 | 9/1978 | Itoh et al. | 134/170 |
| 4,152,173 | 5/1979 | Jackson et al. | 134/170 |
| 4,887,624 | 12/1989 | Eggers | 134/98 |

Primary Examiner—Jill Warden
Assistant Examiner—Saeed Chaudhry
Attorney, Agent, or Firm—Dvorak and Traub

[57] ABSTRACT

A tube or pipe cleaning apparatus in which a rotatable conveyor drum is mounted within a container. The drum periphery is formed with pipe-receiving pockets, where a high pressure solution is simultaneously sprayed over, and within the pipes, to clean them.

9 Claims, 4 Drawing Sheets

METHOD AND APPARATUS FOR CLEANING CYLINDRICAL COMPONENTS WHICH ARE TRANSVERSELY ROTATED IN A DRUM DURING LIQUID TREATMENT

The subject invention concerns a method and an apparatus for cleaning elongate objects, such as tubes, preferably metal tubes.

Following manufacture and severing of tubes to the desired lengths, 2–6 meters, for instance, the tubes must be cleaned before use to remove dirt, such as oil and grease. Generally, the tubes are immerged into hot cleaning baths or apparatuses known as trichloroethylene apparatuses. These methods are inconvenient, time-consuming and do not produce the desired result, particularly as regards removal of chips, grindings and so called rolling dust. Trichloroethylene apparatuses cause other problems as well, especially to the environment, and are becoming obsolete.

In other cases goods of elongate shape are cleaned lengthwise, in tunnel cleaners. From the point of view of washing efficiency such cleaners are satisfactory but they require considerable floor space and their capacity is comparatively low. This cleaning method does not either lend itself to internal cleaning of the tubes.

Mechanical cutting of the elongate objects normally precedes the cleaning thereof. The rapid development of automatic cutting machines in later years has increased the demands for cleaning installations having higher capacities than those afforded by the methods outlined above.

The purpose of the invention is to suggest a method and an apparatus allowing efficient, rapid and space-saving cleaning of elongate objects as described above.

With respect to the method according to which the elongate objects are introduced into a cleaning apparatus, are cleaned by a cleaning liquid contained in said apparatus and are subsequently removed from the apparatus, this purpose is achieved by advancing the elongate objects transversely inside the cleaning apparatus while flushing them internally and externally with the cleaning liquid.

With respect to the cleaning apparatus having an inlet for introducing the dirty elongate objects thereinto, a container holding the liquid for cleaning the elongate objects, and an outlet for removal of the elongate objects after cleaning thereof, the same purpose is achieved by means of a conveyer advancing the elongate objects transversely from the inlet situated on one of the lengthwise side walls of the apparatus to the outlet at the opposite lengthwise side wall thereof, and a cleaning zone including a flushing unit which flushes the cleaning liquid at a high pressure and in a large flow about and through the elongate objects during at least a part of their advancement from the apparatus inlet to the outlet.

The invention will be described in closer detail in the following with reference to the accompanying drawing figures illustrating a presently preferred embodiment of the cleaning apparatus and wherein,

Figure 1:
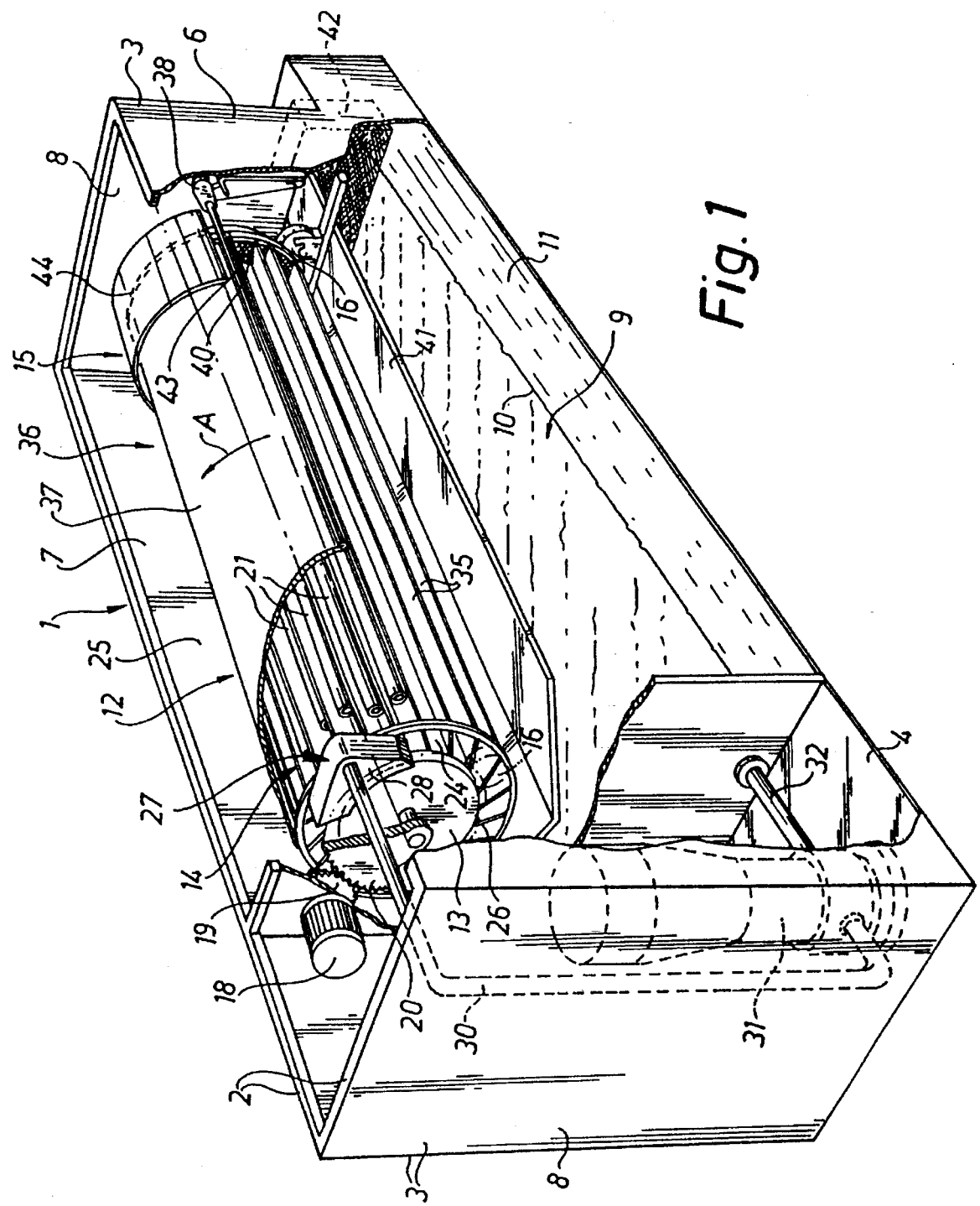
FIG. 1 illustrates the apparatus schematically in a perspective view obliquely from above, certain parts having been cut away in order to illustrate components behind.
Figure 2:
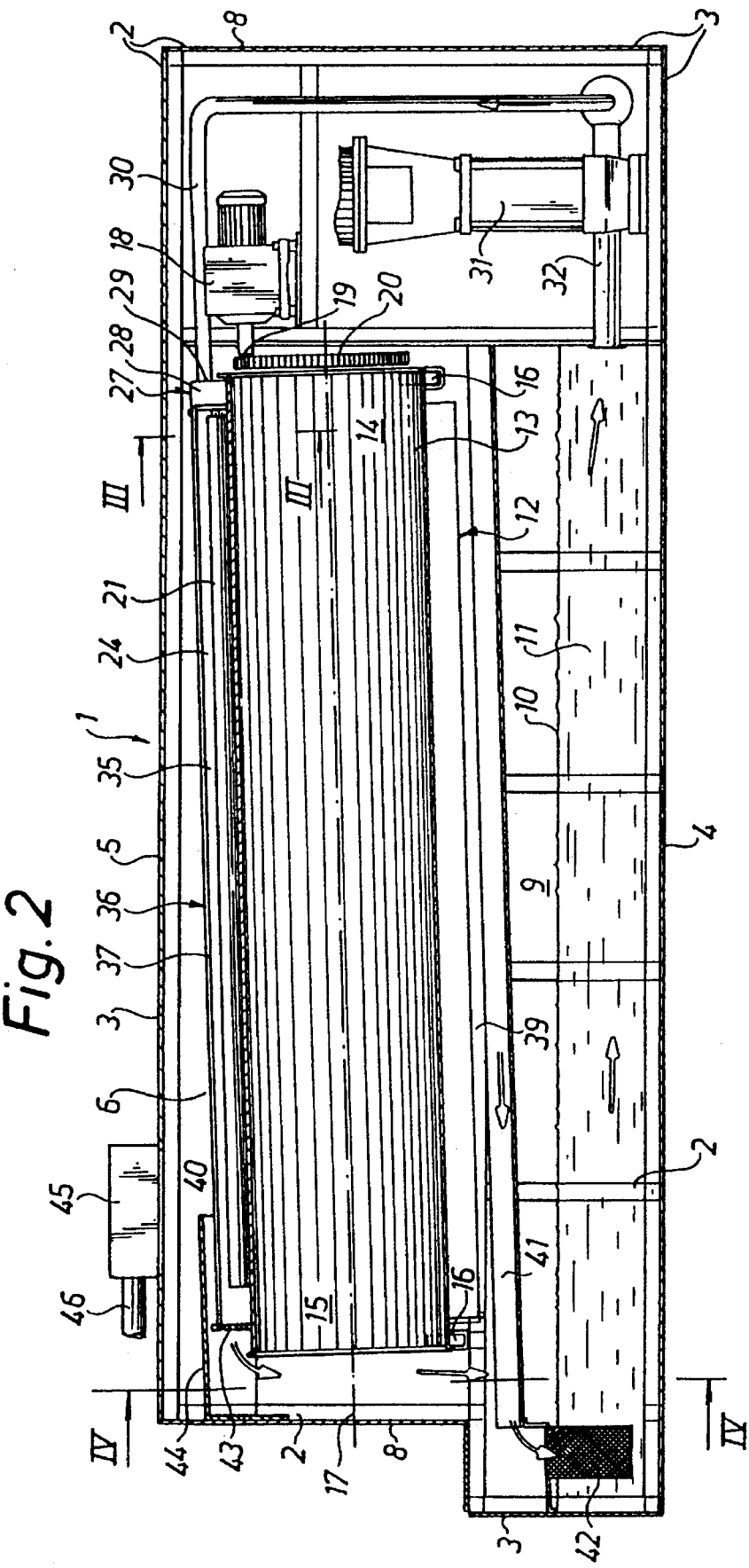
FIG. 2 is a longitudinal sectional view through the apparatus in FIG. 1.

The cleaning apparatus illustrated in the drawings and designated generally by reference 1; is an elongate frame construction erected from frame profile members 2 and covering sheet-metal plates 3 not described herein in detail, and comprising a bottom 4, a top wall 5, front and rear side walls 6 and 7 and end walls 8.

The interior of the apparatus 1 contains a preferably heat-insulated container 9 holding a cleaning fluid 11 which reaches up to a level 10, said cleaning fluid containing water and a detergent, such as 2% of a neutral detergent comprising corrosion inhibiting agents.

A conveyor, designated as a whole by numeral reference 12, is placed inside the container 9 so as to be housed entirely above the cleaning fluid level 10 vertically. In accordance with the embodiment illustrated, the conveyor 12 is a drum 13 rotatably mounted inside the container 9, the drum ends 14, 15 being rotatably supported by support rollers 16. In a manner to be described in closer detail in the following, the drum is arranged to rotate continuously or intermittently about a centre shaft 17 having a slight inclination with respect to the horizontal plane. The shaft is driven by a drive motor 18, which via a gear 19 on the motor output shaft drives a drive wheel 20 which is fixedly secured to the drum 13.

The purpose of the drum 13 is to move the elongate objects 21, such as tubes, preferably metal tubes to be washed, transversely from an inlet 22 (See FIG. 4) disposed on the front side wall 6 of the apparatus i for introduction into the apparatus of the dirtly elongate objects 21, to an outlet 23 (See FIG. 4) situated on the opposite rear side wall 7 of the apparatus for removal of the washed elongate objects.

In order to thus advance the objects, the drum 13 is provided with pockets 24 arranged, during the drum rotation, to receive in succession elongate objects 21 transversely from the inlet and thereafter to carry the objects past a cleaning zone 25 and further onto the outlet 23 for delivery of the cleaned objects so said outlet for further handling. The pockets 24 preferably are equally distributed over the entire periphery 26 of the drum and preferably they extend over substantially the entire length of the drum, from one end 14 thereof, to the opposite end 15.

As appears from the drawing figures, said cleaning zone 25 is positioned within the upper half of the drum 13 and comprises a flushing unit, generally designated by reference 27. The unit is arranged to emit a large flow of cleaning fluid 11 at a high pressure around end through the elongate objects 21, i.e. on the internal and the external faces thereof, over at least a part of the path of advancement of the objects from the inlet 22 to the outlet 23, more precisely in the part thereof corresponding to the cleaning zone 25.

In accordance with the embodiment illustrated the flushing unit 27 is in the form of a distributor box 28 having an inlet which via a supply pipe 30 is connected to the pressure side of a pump 31, such as a vertically oriented centrifugal pump, the suction side of which is connected to the container 9 below the cleaning fluid level 10 via a suction pipe. In accordance with the embodiment illustrated, the distributor box 28 is formed with four outlets 33 in which flushing nozzles 34 are mounted.

In the cleaning zone 25, the distributor box 28 is positioned in the area of the higher-level end 14 of the drum 13 and the flushing nozzles 23 are set to effect their flushing action in the lengthwise direction of the pockets 24 and thus in the lengthwise direction of the elongate objects 21, ensuring that the objects are well flushed on all sides, internally as well as externally, as mentioned previously.

The pockets 24 on the periphery 26 of the drum 12 open outwardly and are delimited laterally by follower means 35 of preferably stainless steel which are mounted on the drum jacket face 26 so as to extend obliquely outwards, so that the follower means 35 present a configuration similar to that of vanes or lamellae.

In the area of the cleaning zone 25 the pockets 24 are, however, covered by a covering member 36 which in accordance with the embodiment illustrated preferably is shaped as a screen 37 of a liquid-tight, pliable material, such as a durable cloth of rubber, or a weave of plastics or similar material, which extends across mainly the upper half of the drum 13.

Figure 3:
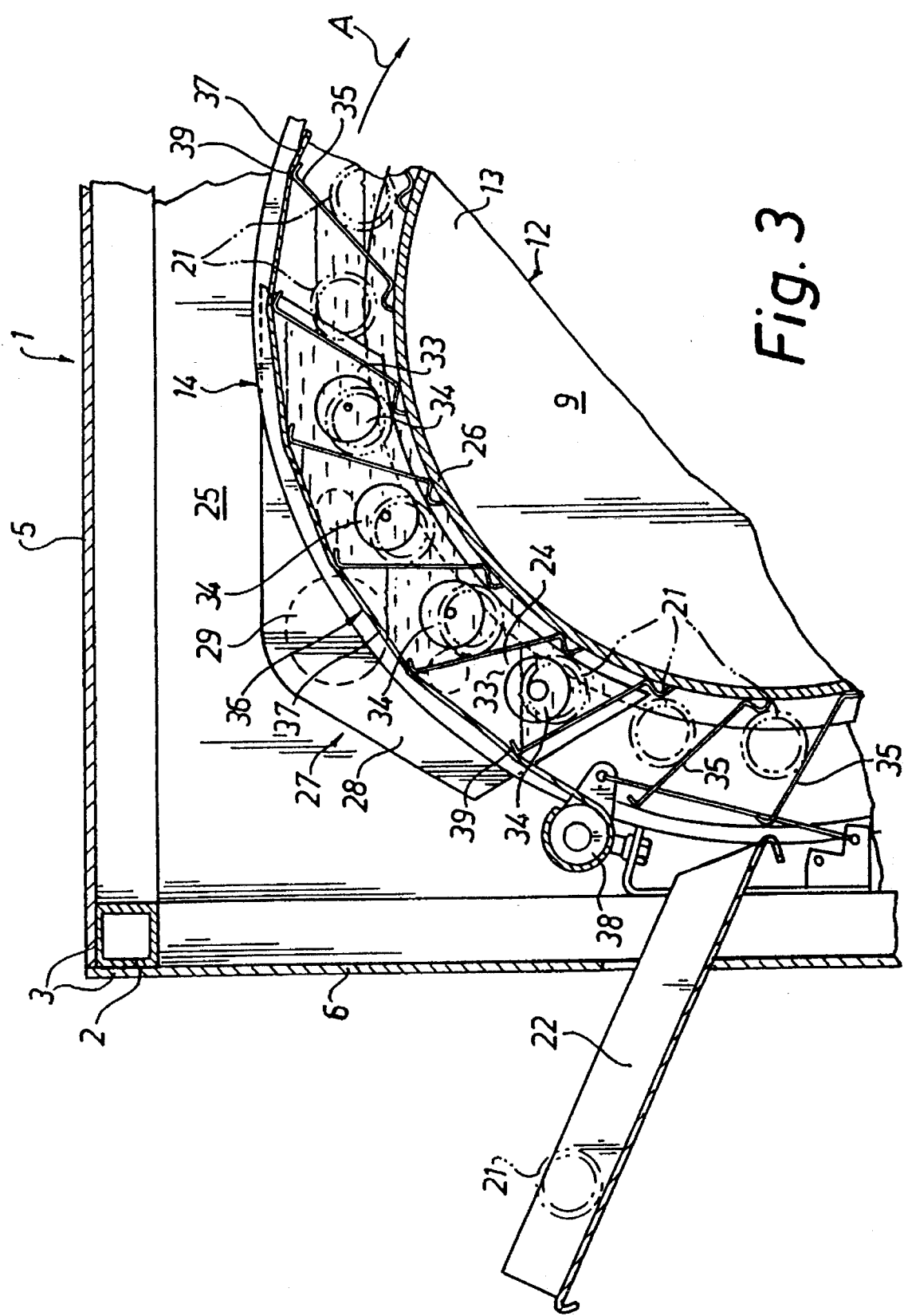
FIG. 3 is a transverse sectional view through a part of the apparatus along line III—III of FIG. 2, end FIG. 4 likewise is a transverse sectional view through the apparatus, in this case along line IV—IV of FIG. 2.

By means of conventional tightening means 38, not shown, the pliable screen 37 may be pre-stressed to a predetermined tension in such a manner that the side thereof facing the drum yieldingly and tightly abuts against the free outer ends 39 of the follower means 35 as is most clearly apparent from FIG. 3.

Owing to the covering member 36 described above, the pockets 24 in the cleaning zone 25 are closed outwards, except at the sides, allowing cleaning fluid 11, during the flushing of the elongate objects 21, to flow through the closed pockets from the flushing nozzles 34 at the higher-level end 14 of the drum to the outlet 40 positioned at the lower-level end 15 thereof and further down into the container 9 via a collector board 41 inclining in the same direction as the drum 14, and a filter 42, for cleaning and re-circulation.

In order to maximize the cleaning effect on the elongate objects 21 one or several of the flushing nozzles 34, positioned in the beginning of the cleaning zone as seen in the direction of rotation A of the drum, emit a larger flow of cleaning liquid than the subsequent flushing nozzles in order to fill the pockets 24—which are closed in the cleaning zone—with flushing cleaning fluid 11 as rapidly as possible.

To prevent the elongate objects 21 that are positioned in the pockets 24 in the cleaning zone from being forced out through the outlets 40 at the lower-level end 15 of the drum 30 when affected by the powerful cleaning fluid flow, the outlets 40 preferably are covered by a grid 43.

Thus, the cleaning fluid 11 leaves the pockets 24 via the grid-covered outlets 40 at a high pressure and in a considerably flow. In cedar to guide the cleaning fluid towards the collector plate 41 while at the same time avoiding unnecessary splashing in the area of the upper part of the drum 13, a curved splash guard 44 is provided in the area of the upper drum part and said outlet 40, said splash guard 44 being secured to the inner face of one of the end walls 8 of the cleaning apparatus 1 so as to extend a certain distance in over and around the drum 13.

Figure 4:
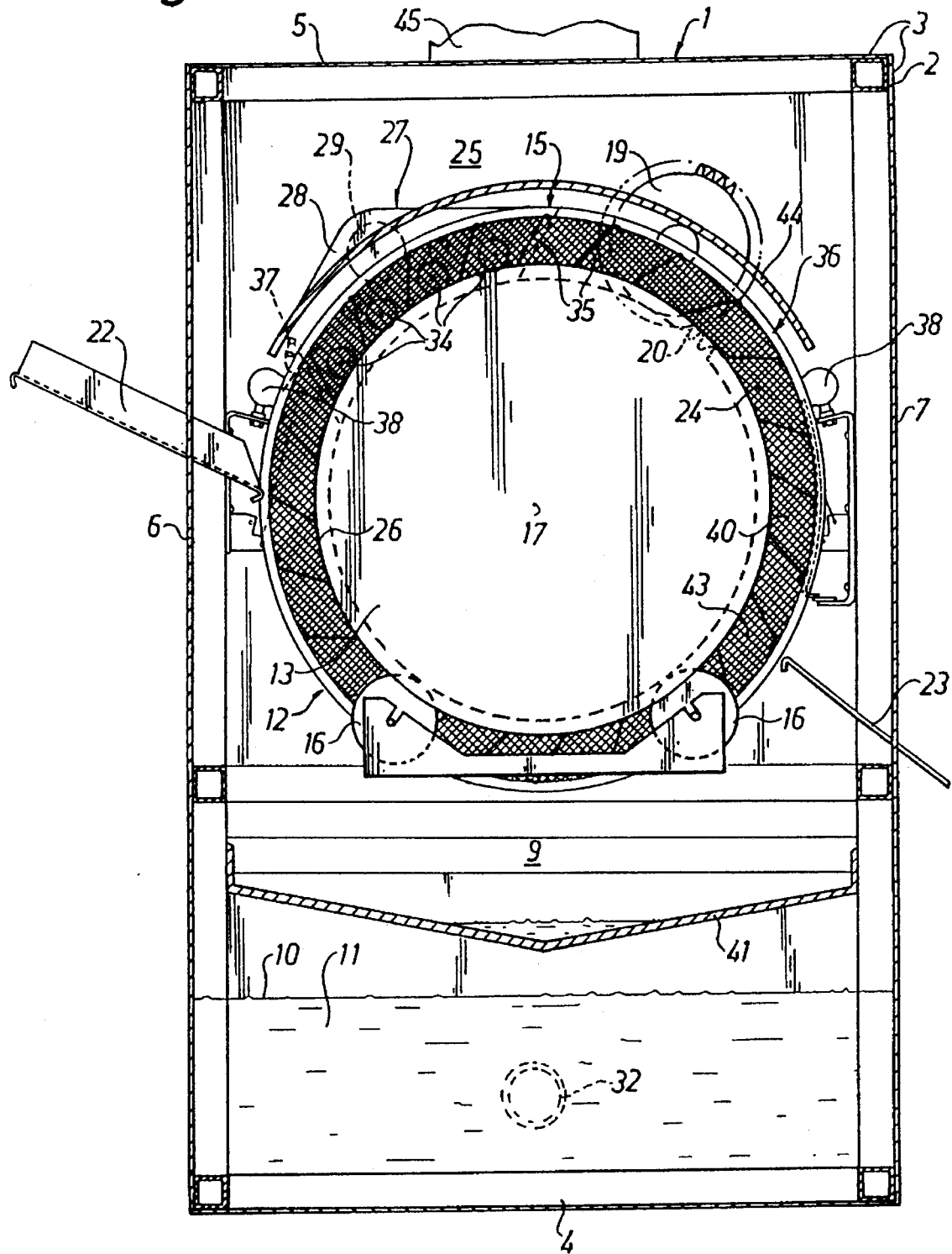

Downstream of the cleaning zone 25 proper, i.e. to the right of the flushing unit 27 in accordance with FIGS. 3 and 4, a rinsing device, not shown, may be provided if desired, in order to rinse the elongate objects after cleaning thereof in the cleaning zone 25, and/or a dryer mechanism, not shown either, may be provided to dry the elongate objects 21 internally or externally before they leave the cleaning apparatus 1 via the outlet 23 therein.

The cleaning liquid 11 in the container 9 is heated to approximately 80° C. by means of a heater, not shown, in the container 9, and in order to remove the condensation and the moisture generated during the cleaning a suction hood 45 is arranged on the top wall 5 of the apparatus 1, a hose, a tube or the like 46 connecting the suction hood 45 to an evacuation fan or the like, not shown.

The invention is not limited to the embodiment described in the aforegoing and illustrated in the drawings but may be modified in a variety of ways within the claimed scope of protection.

I claim:

1. A method for cleaning elongate objects, comprising the steps of:

providing an elongate apparatus for cleaning said elongate objects, said apparatus comprised of an elongate container having an open interior, said interior receiving a rotatably driven cylindrical conveyor drum covered with elongated pockets for receiving said elongate objects, said drum including follower means for delimiting said pockets and a hemispherical cover about an upper half of said drum, said apparatus including a means for conveying a high pressure cleaning solution through and around said elongate objects and a collector plate for receiving said solution after said solution is conveyed;

providing a plurality of elongate objects to be cleaned by introducing said objects into an inlet opening of said apparatus, said inlet opening in communication with said drum such that one object is placed within each of said elongated pockets;

rotating said drum;

spraying said objects in said elongated pockets with said high pressure cleansing solution so as to simultaneously clean an interior and an exterior of said elongate objects and;

removing said elongate objects from said drum through an elongate exit opening of said apparatus.

2. An Apparatus for cleaning elongated objects comprising an elongated apparatus means for cleaning said elongated objects, said apparatus comprised of an elongated container having an open interior, said interior receiving a rotatably driven cylindrical conveyor drum covered with elongated pockets for receiving said elongated objects, said drum including follower means for delimiting said pockets and a hemispherical cover about an upper half of said drum, said apparatus including a means for conveying a high pressure cleaning solution through and around said elongated objects and a collector plate for receiving said solution;

an inlet opening means of said apparatus for receiving said elongated objects, said inlet opening in communication with said drum such that one object is placed within each of said elongated pockets;

rotating means for rotating said drum;

spraying means for spraying said objects in said elongated pockets with said high pressure cleansing solution so as to simultaneously clean an interior and an exterior of said elongated objects and;

removal means for removing said elongated objects from said drum through an elongated exit opening of said apparatus.

3. The apparatus as claimed in claim 2, characterized in that the drum is arranged to rotate continuously about a center shaft extending at a slight angle to a horizontal plane, in that the pockets are distributed around a circumference of the drum and extend along essentially an entire length thereof, and a cleaning zone located within an upper half of the drum.

4. The apparatus as claimed in claim 3, characterized in that a flushing unit is formed with flushing nozzles which are set so as to flush the elongate objects lengthwise, internally and externally.

5. The apparatus as claimed in claim 4, characterized in that the flushing unit is of a distributor box having an inlet which is connected to a pressure side of a pump, a suction side of which is connected to the elongated container below a level of a cleaning fluid therein, and in that the flushing nozzles are mounted in outlets in the distributor box.

6. The apparatus as claimed in claim 5, characterized in that the distributor box is arranged in the upper half of the drum and in that the flushing nozzles flush in the lengthwise direction of the pockets and the elongate objects.

7. The apparatus as claimed in claim 4, characterized in that at least one of the flushing nozzles is positioned at a starting end of a cleaning zone, said nozzles successively filling the pockets with flushing cleaning fluid in a rapid manner.

8. The apparatus as claimed in claim 2 characterized in that the pockets are open outwards towards said drum periphery and are delimited laterally by a follower arranged on the circumference of the drum and directed obliquely outwards, and in that in an area of a cleaning zone the pockets are covered outwardly by a covering means closing the pockets in the cleaning zone outwards and laterally and allowing cleaning fluid to flow through closed pockets from flushing nozzles to outlets in the elongated container.

9. The apparatus as claimed in claim 8, characterized in that the covering means is formed from a screen of a water-tight and pliable material which is arranged so as to extend across essentially the upper half of the drum, said screen secured against the follower members.

* * * * *